US010300556B2

(12) United States Patent
Oka et al.

(10) Patent No.: US 10,300,556 B2
(45) Date of Patent: May 28, 2019

(54) CONTROLLER WITH DROP PREVENTION FUNCTION FOR GAP CONTROL AXIS

(71) Applicant: FANUC Corporation, Yamanashi (JP)

(72) Inventors: Masaki Oka, Yamanashi (JP); Takeshi Mochida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 343 days.

(21) Appl. No.: 15/380,164

(22) Filed: Dec. 15, 2016

(65) Prior Publication Data

US 2017/0173732 A1  Jun. 22, 2017

(30) Foreign Application Priority Data

Dec. 17, 2015 (JP) ................. 2015-246322

(51) Int. Cl.
*B23K 26/08* (2014.01)
*B23K 26/04* (2014.01)
*B23K 26/38* (2014.01)

(52) U.S. Cl.
CPC ........ *B23K 26/0892* (2013.01); *B23K 26/048* (2013.01); *B23K 26/0861* (2013.01); *B23K 26/0869* (2013.01); *B23K 26/38* (2013.01)

(58) Field of Classification Search
CPC .................................... B23K 26/08
USPC ............. 219/121.67–121.72, 121.62, 121.83
See application file for complete search history.

(56) References Cited

U.S. PATENT DOCUMENTS

| 5,444,206 A * | 8/1995 | Isshiki | ................. B23K 26/03 |
| | | | 219/121.63 |
| 2006/0270220 A1 * | 11/2006 | Saitoh | ................. H01J 37/3244 |
| | | | 438/680 |
| 2018/0056444 A1 * | 3/2018 | Bea | ................. B23K 26/0876 |

FOREIGN PATENT DOCUMENTS

| JP | 6-226480 A | 8/1994 |
| JP | H07112348 A | 5/1995 |
| JP | 10-328868 A | 12/1998 |
| JP | 2001-44136 A | 2/2001 |
| JP | 2002-233932 A | 8/2002 |
| JP | 2006-122928 A | 5/2006 |

OTHER PUBLICATIONS

Office Action in JP Application No. 2015-246322, dated Feb. 6, 2018, 7pp.

* cited by examiner

*Primary Examiner* — Samuel M Heinrich
(74) *Attorney, Agent, or Firm* — Hauptman Ham, LLP (57) ABSTRACT

A controller performs gap control such that a Z-axis position of a tip of a cutting head of the machine is not below a preset lower limit position while keeping the distance between the tip of the cutting head and a workpiece constant. The numerical controller calculates a substantial lower limit position based on a detected state of the workpiece and the preset lower limit position. If the Z-axis position of the tip of the cutting head is below the calculated substantial lower limit position, it is compensated so as not to be below the substantial lower limit position.

2 Claims, 11 Drawing Sheets

ROTATION MATRIX P

FIG. 3

COORDINATE (x1, y1, z1) OF TIP POINT OF CUTTING HEAD

INVERSE MATRIX $P^{-1}$ OF ROTATION MATRIX P

COORDINATE (x1', y1', z1') OF NOZZLE TIP OBTAINED BY ROTATING COORDINATE OF TIP POINT BY ROTATION MATRIX

CONTROLLER WITH DROP PREVENTION FUNCTION FOR GAP CONTROL AXIS

RELATED APPLICATIONS

The present application claims priority to Japanese Patent Application Number 2015-246322, filed Dec. 17, 2015, the disclosure of which is hereby incorporated by reference herein in its entirety.

BACKGROUND OF THE INVENTION

Field of the Invention

The present invention relates to a controller, and more particularly, to a controller that performs gap control to keep an amount of gap between a cutting head and a workpiece in controlling a laser machine.

Description of the Related Art

In laser machines, the positional relationship between a cutting head and a workpiece must be held within a predetermined range. To attain this, these machine tools use the technique of gap control such that the distance (amount of gap) between the cutting head and the workpiece is controlled to be kept constant.

Figure 12:
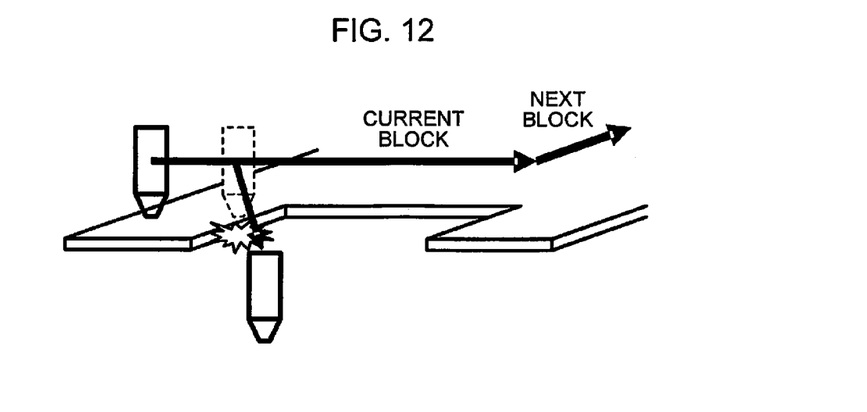
FIG. 12 is a diagram illustrating a problem of gap control.
Figure 13:
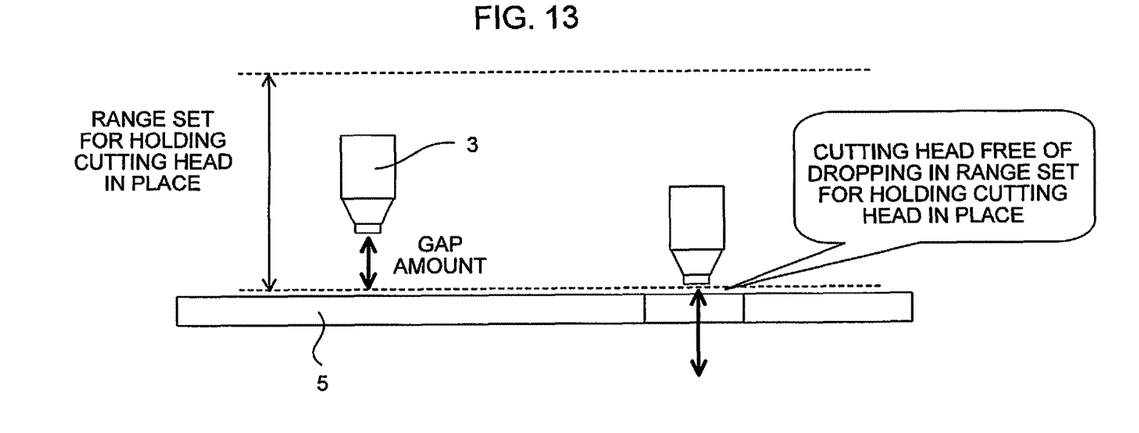
FIG. 13 is a diagram illustrating a conventional cutting head drop prevention function of a controller.

When the cutting head passes a place where the workpiece is not present during the gap control, as shown in FIG. 12, it is detected to be located at a height based on a surface further below the workpiece. In some cases, therefore, the gap control may be performed based on the detected height so that the cutting head drops and hits an end of the workpiece, thereby damaging it. In order to prevent such dropping of the cutting head, a technique is proposed in which the height of a cutting head 3 is detected and controlled to be kept within a predetermined range to machine a workpiece 5, as shown in FIG. 13 (e.g., Japanese Patent Application Laid-Open No. 07-112348, hereinafter referred to as the prior art).

Figure 14:
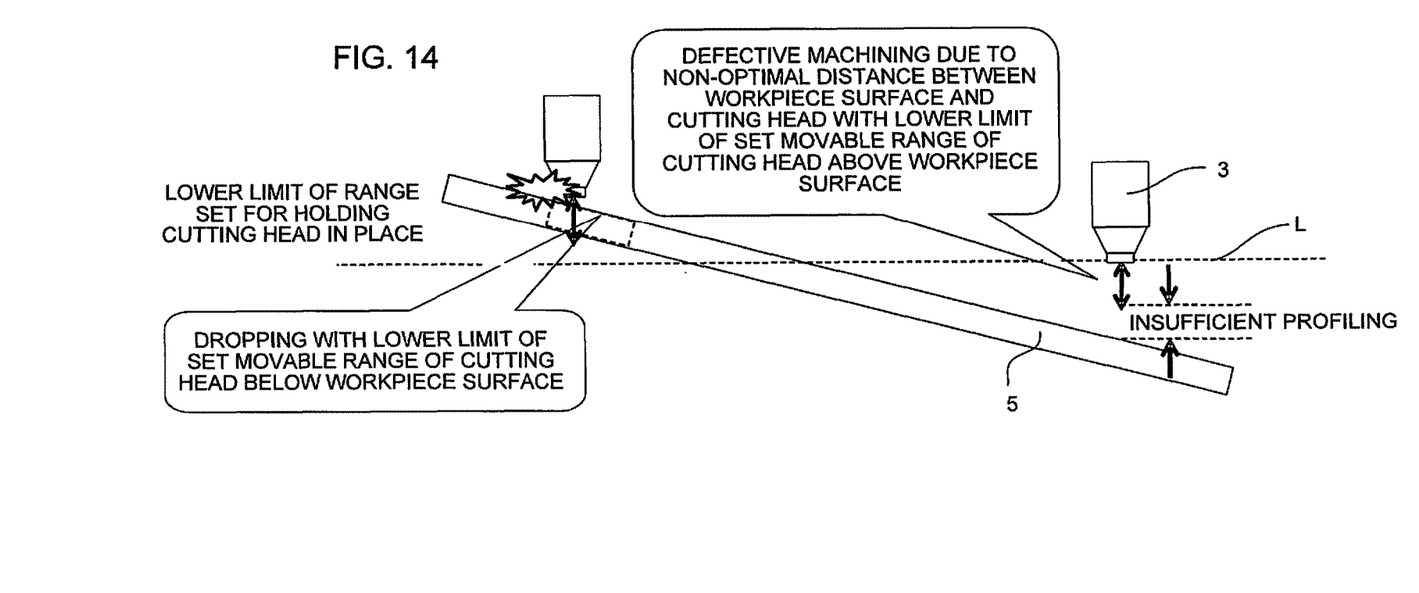
FIG. 14 is a diagram illustrating a first problem of the prior art drop prevention function.

However, even if an attempt is made to prevent dropping of the cutting head by applying the above prior art to machining in which the workpiece 5 is inclined as it is machined, as shown in FIG. 14, an area set as a movable range of the cutting head 3 does not change according to this prior art. Thus, in an area (left-side area in FIG. 14) in which a lower limit L of the set movable range of the cutting head 3 is below the surface of the workpiece 5, the cutting head 3 may possibly drop in a place where the workpiece 5 is not present. In an area (right-side area in FIG. 14) in which the lower limit L of the set movable range of the cutting head 3 is above the surface of the workpiece 5, in contrast, the cutting head 3 may not be able to satisfactorily profile the workpiece 5, possibly resulting in defective machining.

Figure 15:
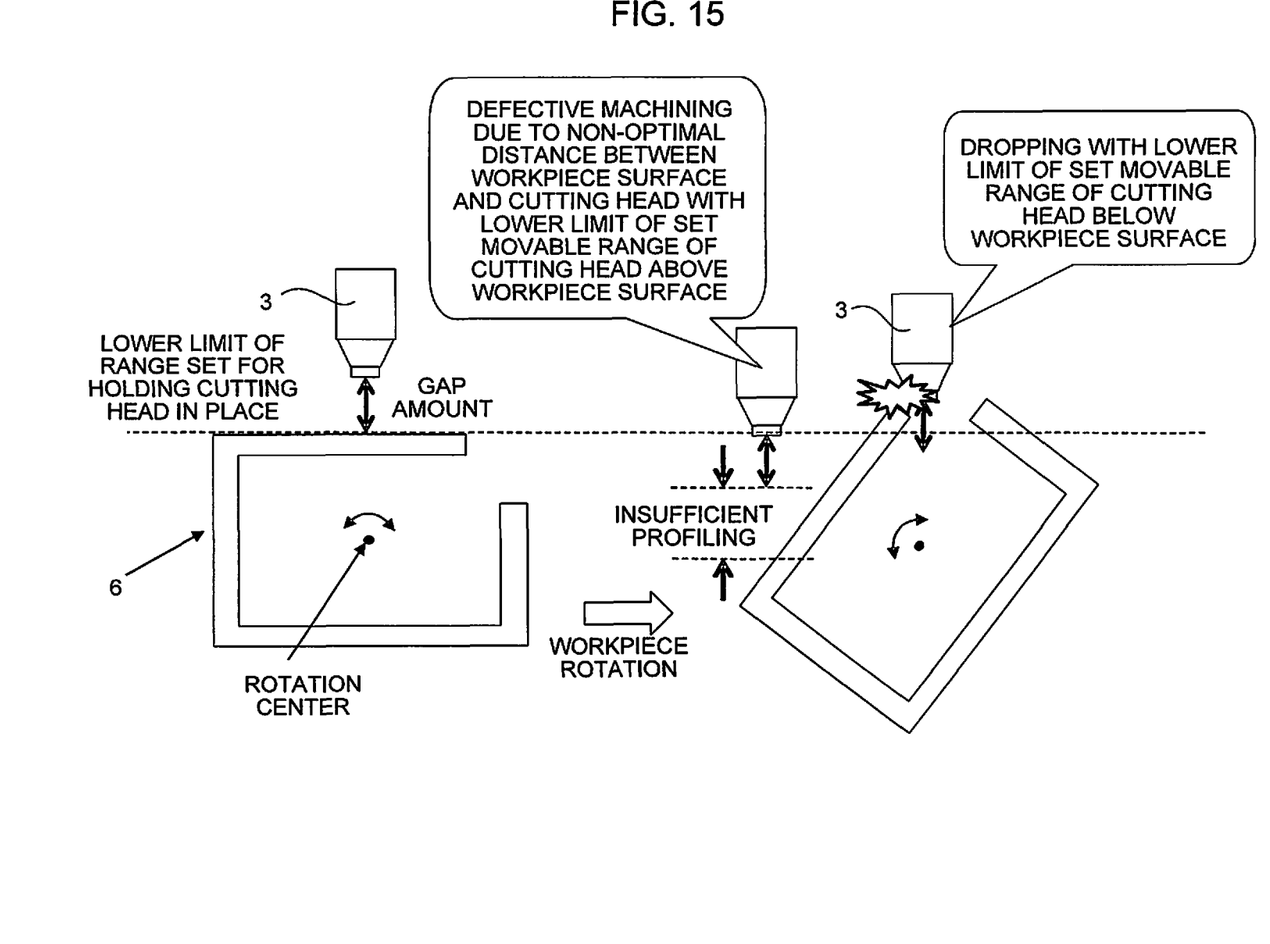
FIG. 15 is a diagram illustrating a second problem of the prior art drop prevention function.

Moreover, in machining a pipe as the workpiece, the height of the surface of a workpiece 6 to which beams are applied changes when the workpiece 6 is rotated, as shown in FIG. 15. Therefore, the lower limit L of the movable range of the cutting head 3 never changes even if an attempt is made to prevent dropping of the cutting head 3 by applying the above-described prior art to machining of the workpiece 6. Thus, as in the case of FIG. 14, there is a possibility of the cutting head 3 dropping or failing to satisfactorily profile the workpiece and thereby resulting in defective machining.

SUMMARY OF THE INVENTION

Accordingly, the object of the present invention is to provide a controller configured to perform gap control such that a cutting head can be prevented from suffering a drop or insufficient profiling even when a workpiece is inclined.

In a controller of the present invention, gap control is performed in such a manner that an area set as a movable range of a cutting head is inclined in accordance with the inclination of a workpiece set in place. Moreover, a new method for setting the movable range of the cutting head is proposed to enlarge the range of application of a drop prevention function of a gap control axis.

A controller according to the present invention is a controller for controlling a machine which performs cutting of a workpiece and performs gap control such that a Z-axis position of a tip of a cutting head of the machine is not below a preset lower limit position while keeping the distance between the tip of the cutting head and the workpiece constant.

A first form of the controller comprises a workpiece state detection unit configured to detect a state of the workpiece and a lower limit position limiting unit configured to compensate the Z-axis position of the tip of the cutting head so as not to be below a substantial lower limit position calculated based on the state of the workpiece and the preset lower limit position if the Z-axis position of the tip of the cutting head is below the substantial lower limit position.

The state of the workpiece may be information on an inclination of the workpiece, and the lower limit position limiting unit may be configured to calculate the substantial lower limit position by transforming the preset lower limit position based on the information on the inclination of the workpiece.

A second form of the controller comprises a workpiece state detection unit configured to detect a state of the workpiece and a lower limit position limiting unit configured to compensate the Z-axis position of the tip of the cutting head so that the coordinate values of a substantial position of the tip of the cutting head relative to the workpiece transformed based on the state of the workpiece are not below the preset lower limit position if the coordinate values of the substantial position of the tip of the cutting head are below the preset lower limit position.

According to the present invention, a movable range of a cutting head can be inclined in accordance with the inclination of a workpiece set in place even when the workpiece is inclined, so that a drop prevention function of the cutting head in gap control can be used without causing the cutting head to drop or producing an area subject to defective machining. Also, the drop prevention function of the cutting head in the gap control can be used in pipe machining.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1A:
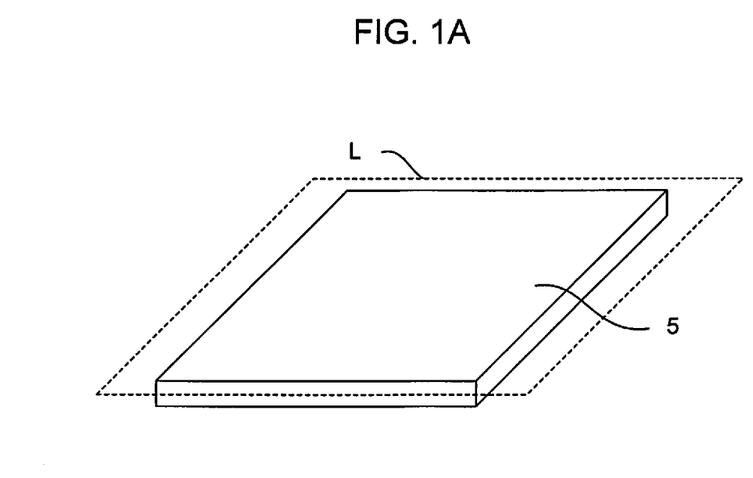
FIGS. 1A and 1B are diagrams showing setting of the lower limit of a movable area of a cutting head performed by a controller according to the present invention.
Figure 1B:
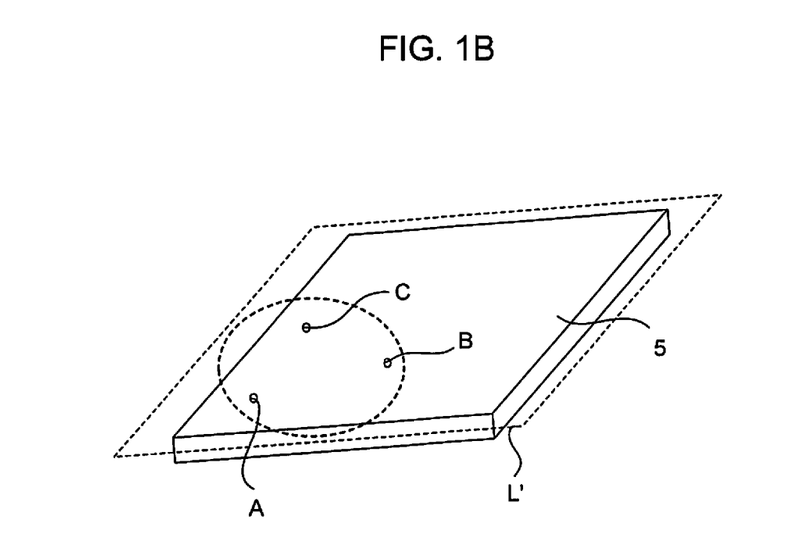

First, setting of the lower limit of a movable area of a cutting head performed by a controller according to the present invention will be described with reference to FIGS. 1A and 1B.

The controller (not shown) according to the present invention sets a lower limit L of the movable area of the cutting head (not shown) to maintain the height level of the cutting head. FIG. 1A shows the lower limit L of the movable area of the cutting head (not shown) set when a workpiece 5 is not inclined.

If the controller detects that the workpiece 5 is inclined before machining based on gap control is started, it inclines an area (a lower limit L' of the movable area of the cutting head) set as the movable range of the cutting head in accordance with the inclination of the workpiece 5. The inclination of the workpiece 5 can be calculated based on the coordinate values of three optional points (A, B and C) on the workpiece that are measured before the machining, for example.

Figure 2:
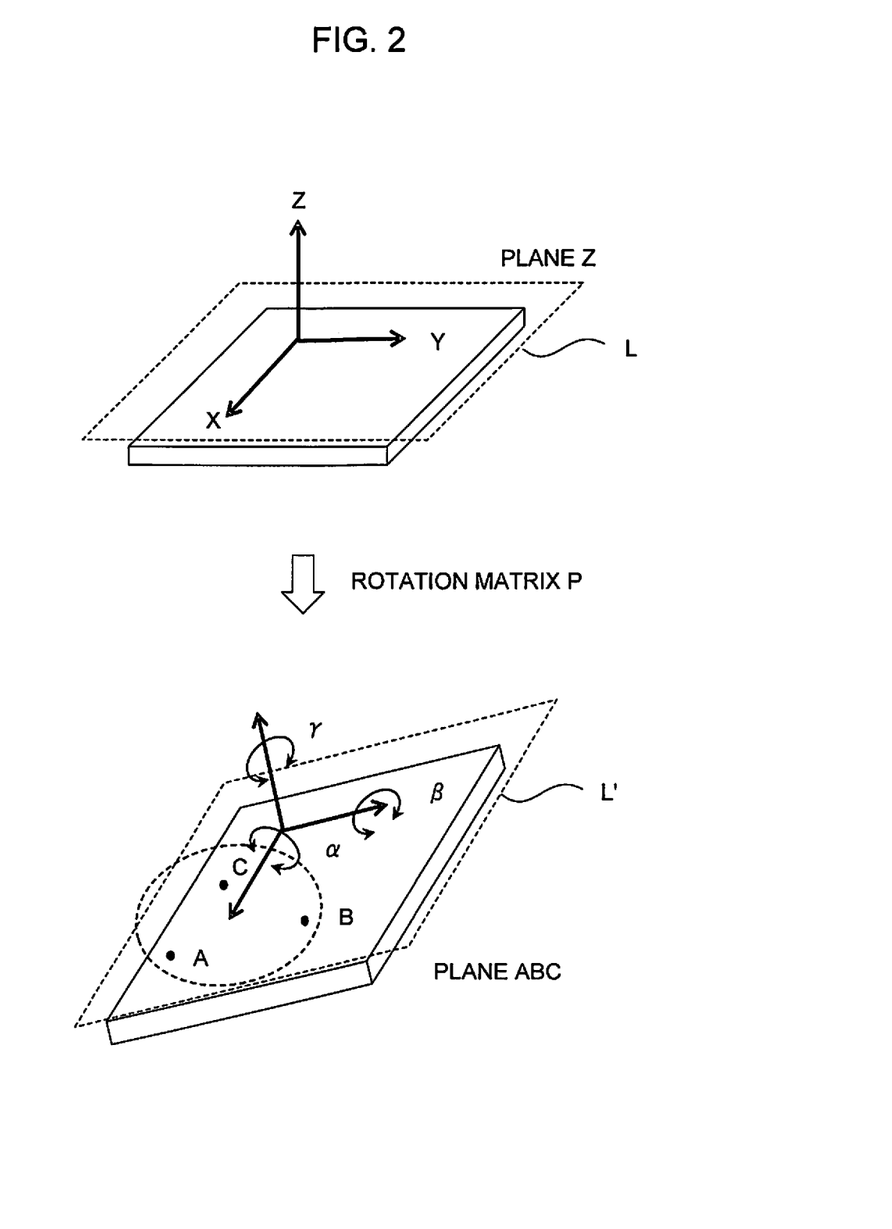
FIG. 2 is a diagram illustrating a calculation method for inclining the lower limit of the movable area of the cutting head.

FIG. 2 is a diagram illustrating a calculation method for inclining the lower limit of the area set as the movable range of the cutting head.

When the lower limit L of the movable area of the cutting head is on a horizontal plane Z, as shown in FIG. 2, the Z-axis height of the plane Z is given as z. When the lower limit L of the movable area of the cutting head is inclined, three points A, B and C on the inclined plane L' defined as a plane ABC are measured. If the inclination to the plane Z is represented by rotation angles ($\alpha$, $\beta$, $\gamma$) about X-, Y-, and Z-axes of a workpiece coordinate system, a rotation matrix P for transforming the plane Z into the plane ABC can be given as follows:

$$P = \begin{pmatrix} \cos\gamma\cos\beta - \sin\gamma\sin\alpha & \cos\gamma\cos\beta + \sin\gamma\cos\alpha & -\cos\gamma\cos\beta \\ -\sin\gamma\cos\beta - \cos\gamma\sin\alpha & -\sin\gamma\cos\beta - \cos\gamma\cos\alpha & \sin\gamma\sin\beta \\ \sin\beta\cos\alpha & \sin\beta\sin\alpha & \cos\beta \end{pmatrix} \quad (1)$$

Figure 3:
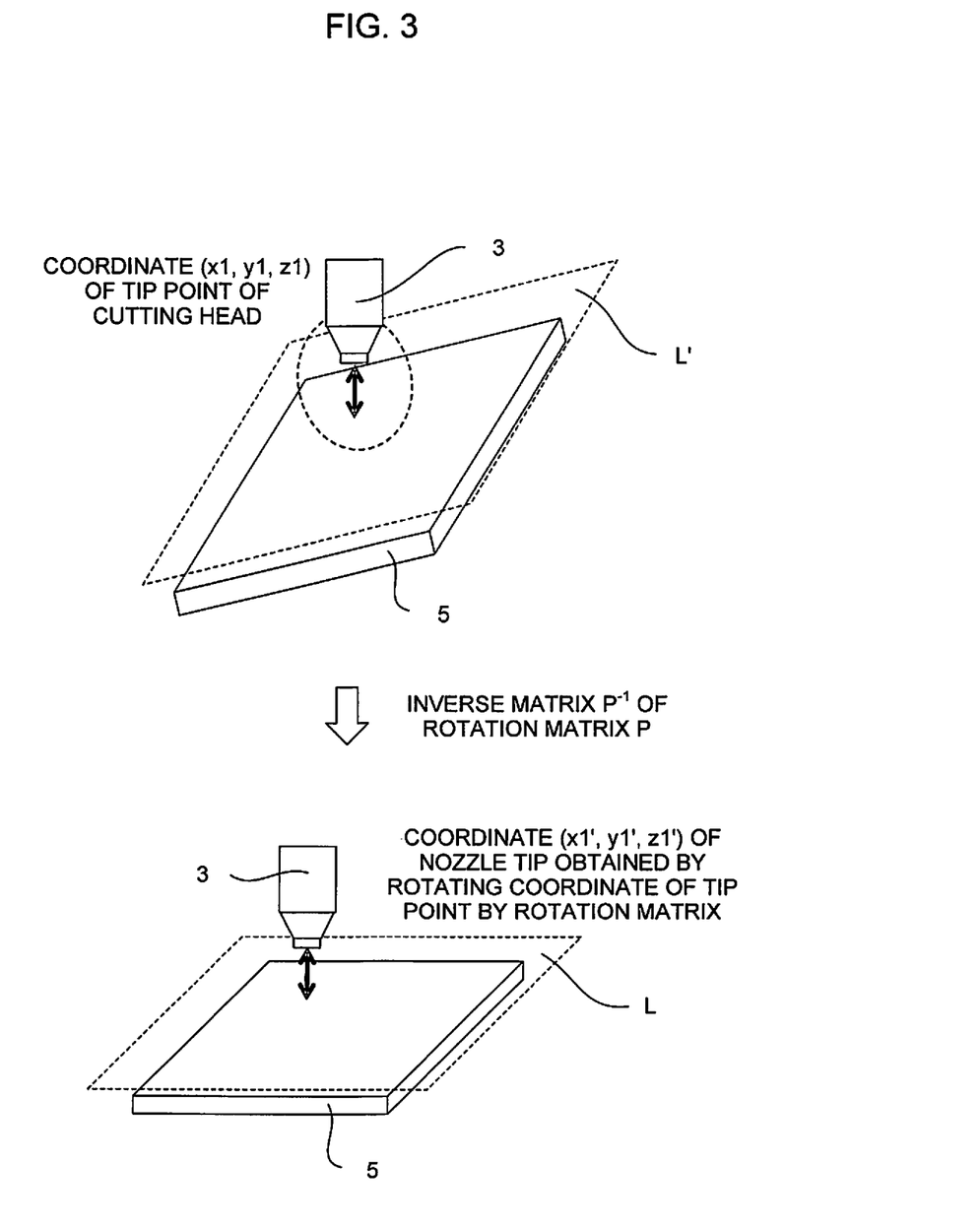
FIG. 3 is a diagram illustrating a method for transforming the coordinate values of a tip point of the cutting head.

In performing gap control of a cutting head 3, in the controller of the present invention, coordinate values (x1', y1', z1') are calculated by transforming coordinate values (x1, y1, z1) of the tip of the cutting head 3 during machining by an inverse matrix $P^{-1}$ of the rotation matrix P, as shown in FIG. 3. The control is performed so that the calculated Z-axis coordinate value z1' is not lower than a height level z set as the lower limit. Alternatively, a plane Z' may be obtained such that the horizontal plane Z indicative of the lower limit L of the movable area of the cutting head is transformed by the rotation matrix P, whereby the coordinate values (x1, y1, z1) of the tip of the cutting head during the machining can be controlled so as not to be below the plane Z'.

Figure 4:
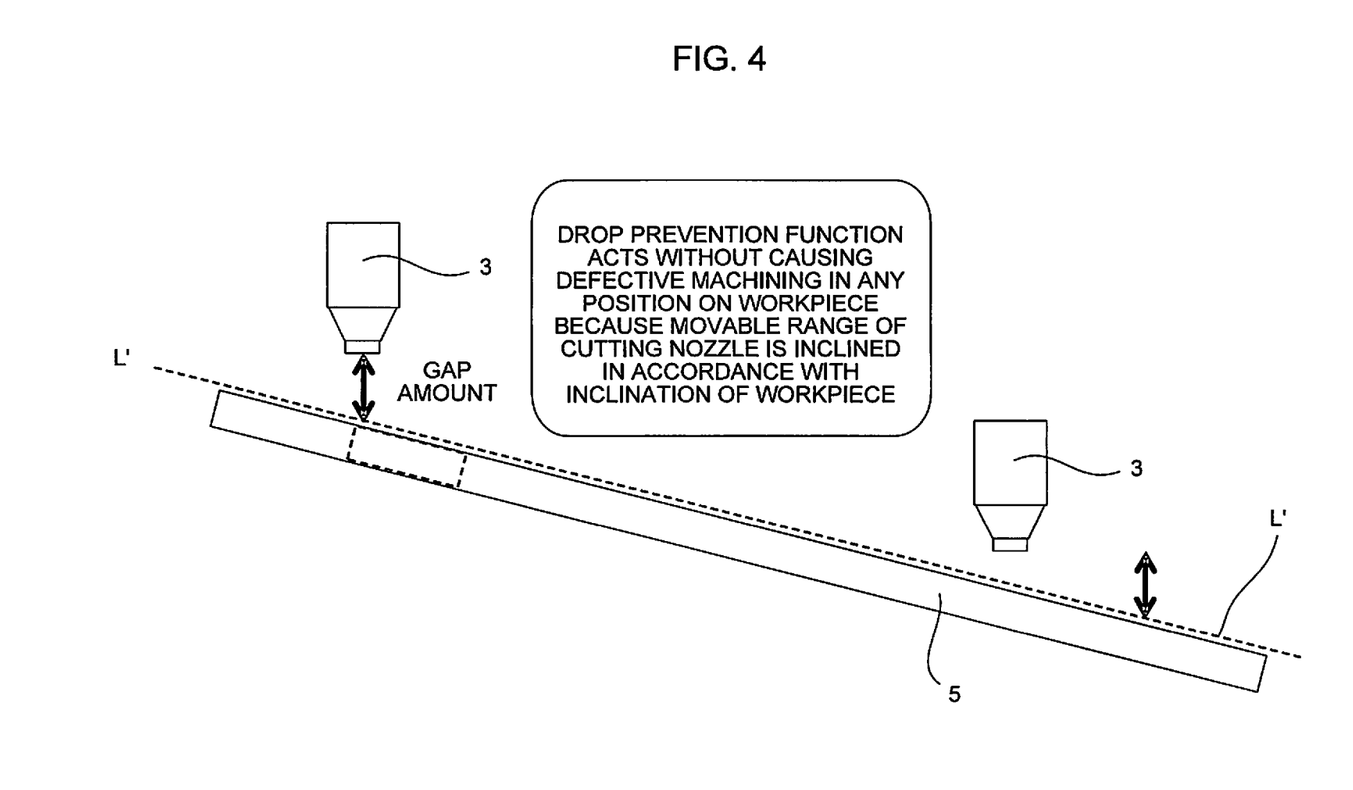
FIG. 4 is a diagram illustrating the effect of control of the cutting head in flat plane machining using the controller according to the present invention.

By performing the gap control of the cutting head 3 as described above, the movable area of the cutting head 3 (lower limit L' of the movable area of the cutting head) can be inclined in accordance with the inclination of the set workpiece 5, as shown in FIG. 4, even when the workpiece is inclined. Thus, a drop prevention function can be used without causing the cutting head 3 to drop or producing an area subject to defective machining.

Moreover, in the controller according to the present invention, if the workpiece is a square or round pipe, the movable area of the cutting head is defined based on a case in which the rotation angle of the pipe is 0°.

Figure 5:
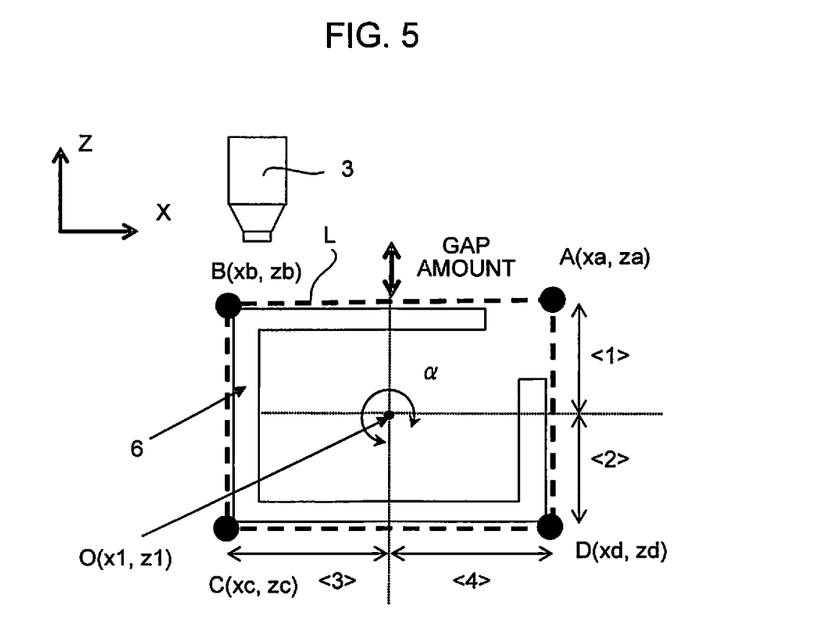
FIG. 5 is a diagram illustrating the definition of the movable area of the cutting head for the case in which a workpiece is a square pipe.

FIG. 5 is a diagram illustrating the definition of the movable area of the cutting head for the case in which the workpiece is a square pipe.

If a workpiece 6 is a square pipe, four points A, B, C and D on the workpiece 6 as viewed from an X-Z plane are defined using distances (<1>, <3>, <2> and <4>) from a rotation center O of the workpiece 6. Four points A', B', C' and D' are obtained by rotating the defined four points A, B, C and D in accordance with a rotation angle $\alpha$ of the workpiece 6.

Figure 6:
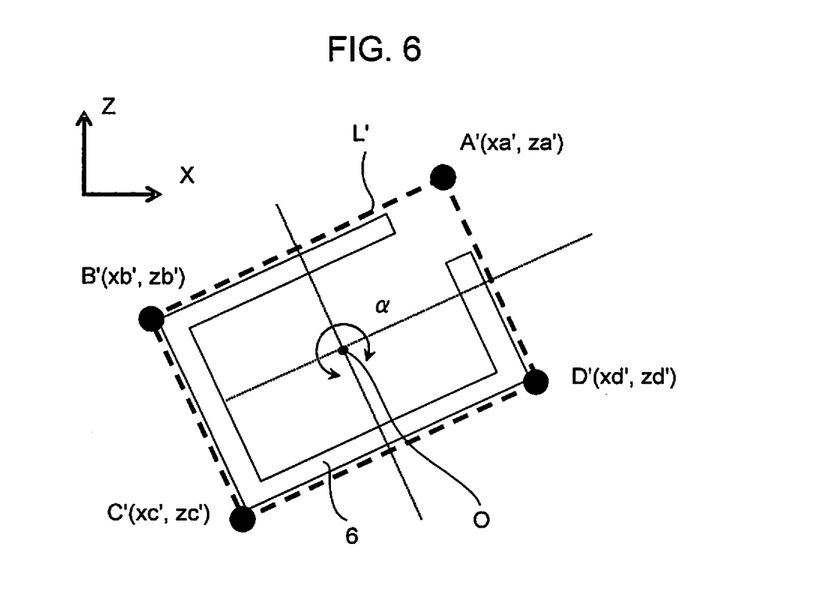
FIG. 6 is a diagram showing a calculation method for inclining the lower limit of an area set as the movable range of the cutting head for the case in which the workpiece is a square pipe.

FIG. 6 is a diagram showing a calculation method for inclining the lower limit L of the area set as the movable range of the cutting head for the workpiece 6 of FIG. 5.

The controller controls the Z-axis coordinate value of the cutting head so as to satisfy the following expressions.

$\alpha = 0°$:

$Z \geq$ Straight line $B'A'(xb' \leq X \leq xa')$. \quad (1)

$0° < \alpha < 90°$:

$Z \geq$ Straight line $B'A'(xb' \leq X \leq xa')$, $Z \geq$ Straight line $A'D'(xa' \leq X \leq xd')$. \quad (2)

$\alpha = 90°$:

$Z \geq$ Straight line $A'D'(xa' \leq X \leq xd')$. \quad (3)

$90° < \alpha < 180°$:

$Z \geq$ Straight line $A'D'(xa' \leq X \leq xd')$, $Z \geq$ Straight line $D'C'(xd' \leq X \leq xc')$. \quad (4)

$\alpha = 180°$:

Z≥Straight line $D'C'(xd'≤X≤xc')$. (5)

$180°<α<270°$:

Z≥Straight line $D'C'(xd'≤X≤xc')$,

Z≥Straight line $C'B'(xc'≤X≤xb')$. (6)

$α=270°$:

Z≥Straight line $C'B'(xc'≤X≤xb')$. (7)

$270°<α<360°$:

Z≥Straight line $C'B'(xc'≤X≤xb')$,

Z≥Straight line $B'A'(xb'≤X≤xa')$. (8)

Figure 7:
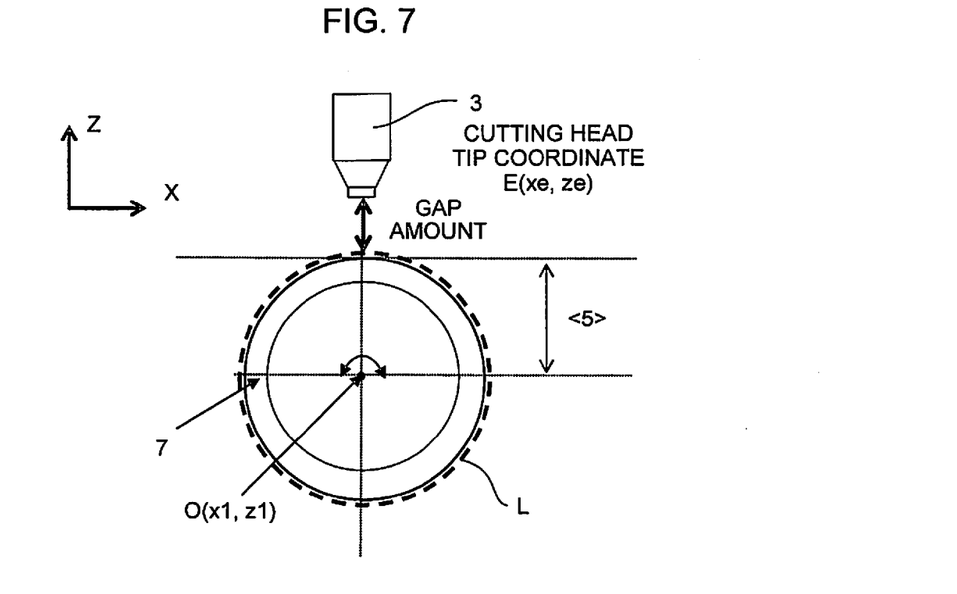
FIG. 7 is a diagram illustrating the definition of the movable area of the cutting head for the case in which the workpiece is a round pipe.

FIG. 7 is a diagram illustrating the definition of the movable area of the cutting head for the case in which the workpiece is a round pipe.

If a workpiece 7 is a round pipe, the distance between a coordinate E (xe, ze) of the cutting head tip and the rotation center O (x1, z1) is calculated. The controller holds the cutting head in place by controlling the Z-axis coordinate value of the cutting head so as to satisfy expression (2) as follows:

$$<5>≤\sqrt{(xe-x1)^2+(ze-z1)^2}$$ (2)

In expression (2) above, <5> is the distance from the rotation center of the workpiece 7 (round pipe) to the lower limit L of the movable area of the cutting head, as shown in FIG. 7.

Figure 8:
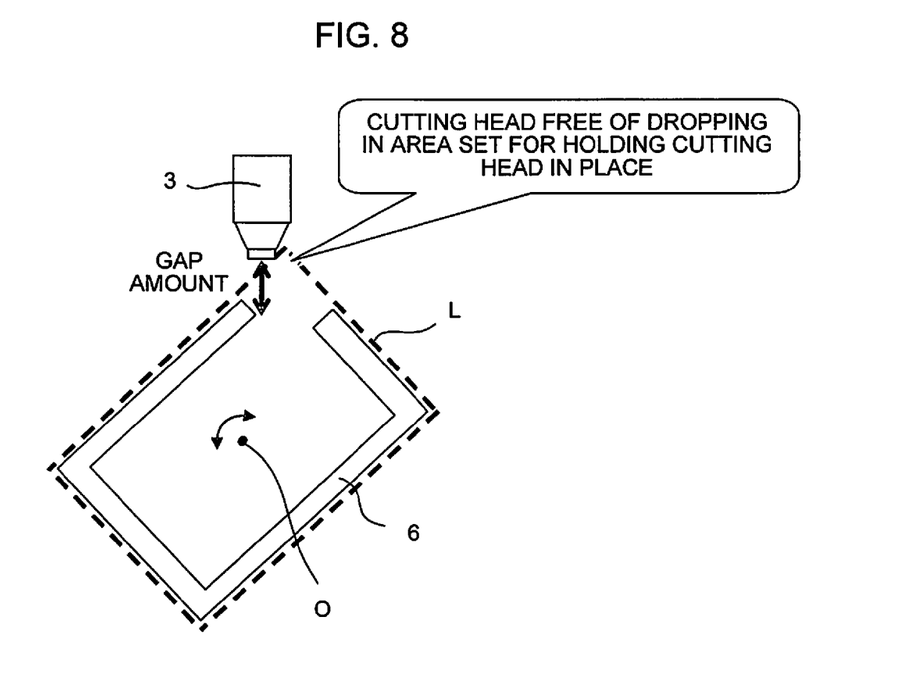
FIG. 8 is a diagram illustrating the effect of control of the cutting head in pipe machining using the controller according to the present invention.

By performing the gap control of the cutting head 3 in the manner described above, the drop prevention function of the cutting head 3 of the controller of the present invention can be used without causing the cutting head to drop or producing an area subject to defective machining even in pipe machining, as shown in FIG. 8.

Figure 9:
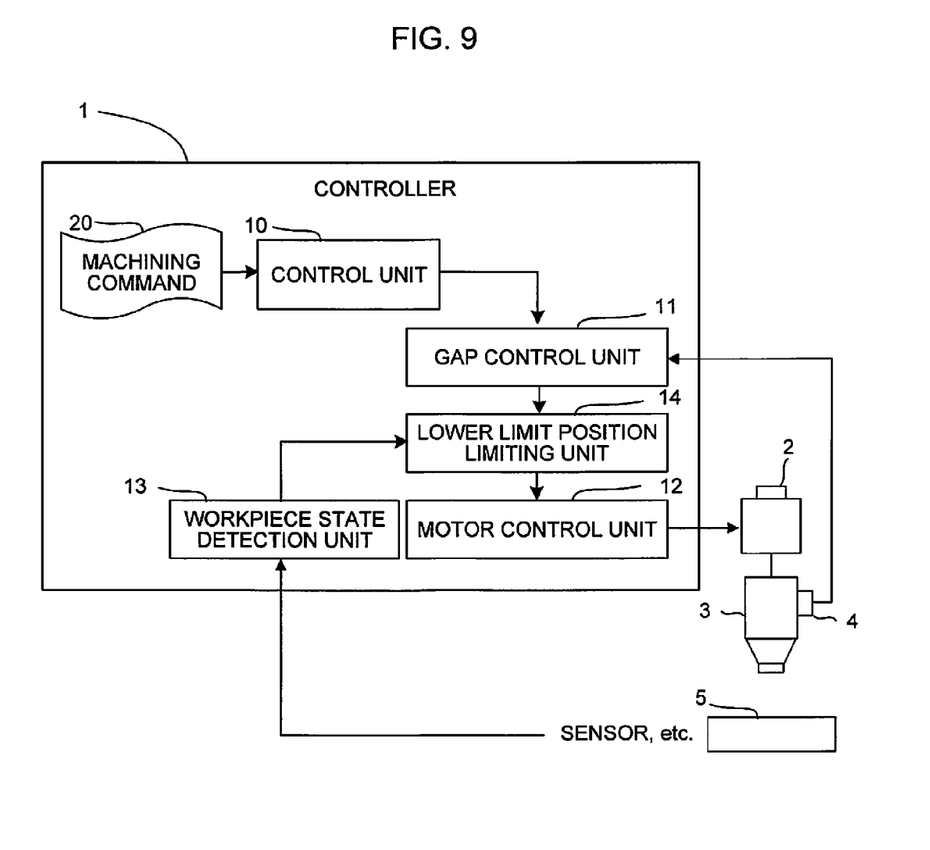
FIG. 9 is a schematic block diagram of a controller according to one embodiment of the present invention.

FIG. 9 is a schematic block diagram of a controller according to one embodiment of the present invention for the gap control described above.

A controller 1 comprises a control unit 10, gap control unit 11, and motor control unit 12. The control unit 10 analyzes a machining command 20 and generates move command data for each axis motor to be controlled. The gap control unit 11 compensates a Z-axis stroke based on the move command data so as to keep the distance between the cutting head 3 and the workpiece 5 constant, based on a signal fed back from a sensor 4 for detecting the amount of gap between the cutting head 3 and the workpiece 5. The motor control unit 12 controls a Z-axis motor 2 for controlling the Z-axis position of the cutting head 3. Typical constituent elements of the controller, such as various axis motors for controlling the relative positions of the cutting head 3 and the workpiece 5 in various axis directions, e.g., the X- and Y-axis directions, and axis motor control units for controlling the motors are not shown in FIG. 5.

The controller 1 shown in FIG. 9 further comprises a workpiece state detection unit 13 and a lower limit position limiting unit 14. The workpiece state detection unit 13 detects the state of the workpiece 5 based on information detected by a sensor and information including the coordinate values of the axes from the motor control units for axes other than the Z-axis. The lower limit position limiting unit 14 obtains the lower limit L of the movable area of the cutting head by the aforementioned calculation method, based on the state of the workpiece 5 detected by the workpiece state detection unit 13, and limits the Z-axis stroke in the move command data compensated by the gap control unit 11 based on the lower limit L. The motor control unit 12 controls the Z-axis motor 2 based on the move command data in which the Z-axis stroke is limited by the lower limit position limiting unit 14.

The state of the workpiece detected by the workpiece state detection unit 13 is the inclination of the workpiece 5 calculated based on the coordinate values of the three points (A, B and C in FIG. 1B) from the surface of the workpiece 5 by a touch sensor or distance sensor (not shown) as mentioned before, if the workpiece is a flat plate. Moreover, if the workpiece is a square pipe, the workpiece state is the rotation angle of the workpiece 6 obtained from the coordinate values of corner points of the workpiece 6 detected by a sensor or the like and the axis motor control units.

Figure 10:
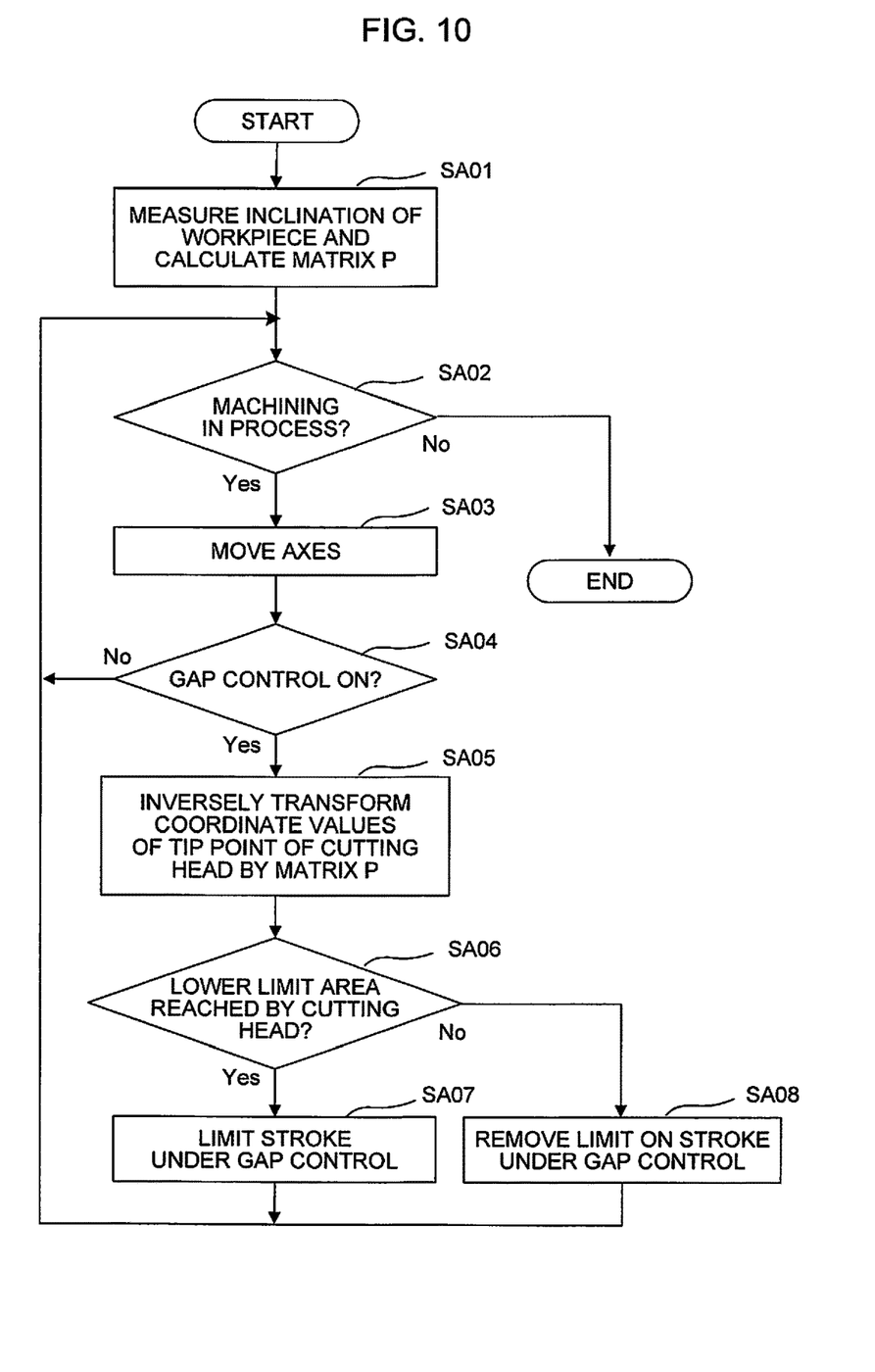
FIG. 10 is a flowchart showing an operation in which a machine is controlled by the controller of FIG. 9 to machine a flat workpiece.

FIG. 10 is a flowchart showing an operation in which a machine (cutting head 3) is controlled by the controller 1 of FIG. 9 to machine the flat workpiece 5.

[Step SA01] The lower limit position limiting unit 14 calculates a transformation matrix P based on the inclination of the workpiece 5 detected by the workpiece state detection unit 13.

[Step SA02] The control unit 10 determines whether or not the machining of the workpiece 5 is being performed. If the machining is being performed, the processing proceeds to Step SA03. If not, this processing ends.

[Step SA03] The control unit 10 analyzes the machining command 20 and generates and outputs the move command data for the axes.

[Step SA04] The gap control unit 11 determines whether or not the gap control is on. If the gap control is on, the Z-axis stroke based on the gap control is compensated, whereupon the processing proceeds to Step SA05. If the gap control is off, the move command data is output directly to the motor control unit 12, whereupon the processing proceeds to Step SA02.

[Step SA05] The lower limit position limiting unit 14 acquires the coordinate values of the tip point of the cutting head 3 from the move command data and inversely transforms (transforms by an inverse matrix) the acquired coordinate values of the tip point of the cutting head 3 by the matrix P calculated in Step SA01.

[Step SA06] The lower limit position limiting unit 14 determines whether or not the lower limit L of the movable area of the cutting head 3 is reached by the tip point of the cutting head 3, based on the Z-axis coordinate value of the coordinate values inversely transformed in Step SA05. If the lower limit L is reached, the processing proceeds to Step SA07. If not, the processing proceeds to Step SA08.

[Step SA07] The lower limit position limiting unit 14 limits the Z-axis stroke compensated by the gap control unit 11 so that the cutting head tip point does not reach the lower limit L of the movable area of the cutting head 3, whereupon the processing returns to Step SA02.

[Step SA08] The lower limit position limiting unit 14 removes the limit on the Z-axis stroke compensated by the gap control unit 11, whereupon the processing returns to Step SA02.

Figure 11:
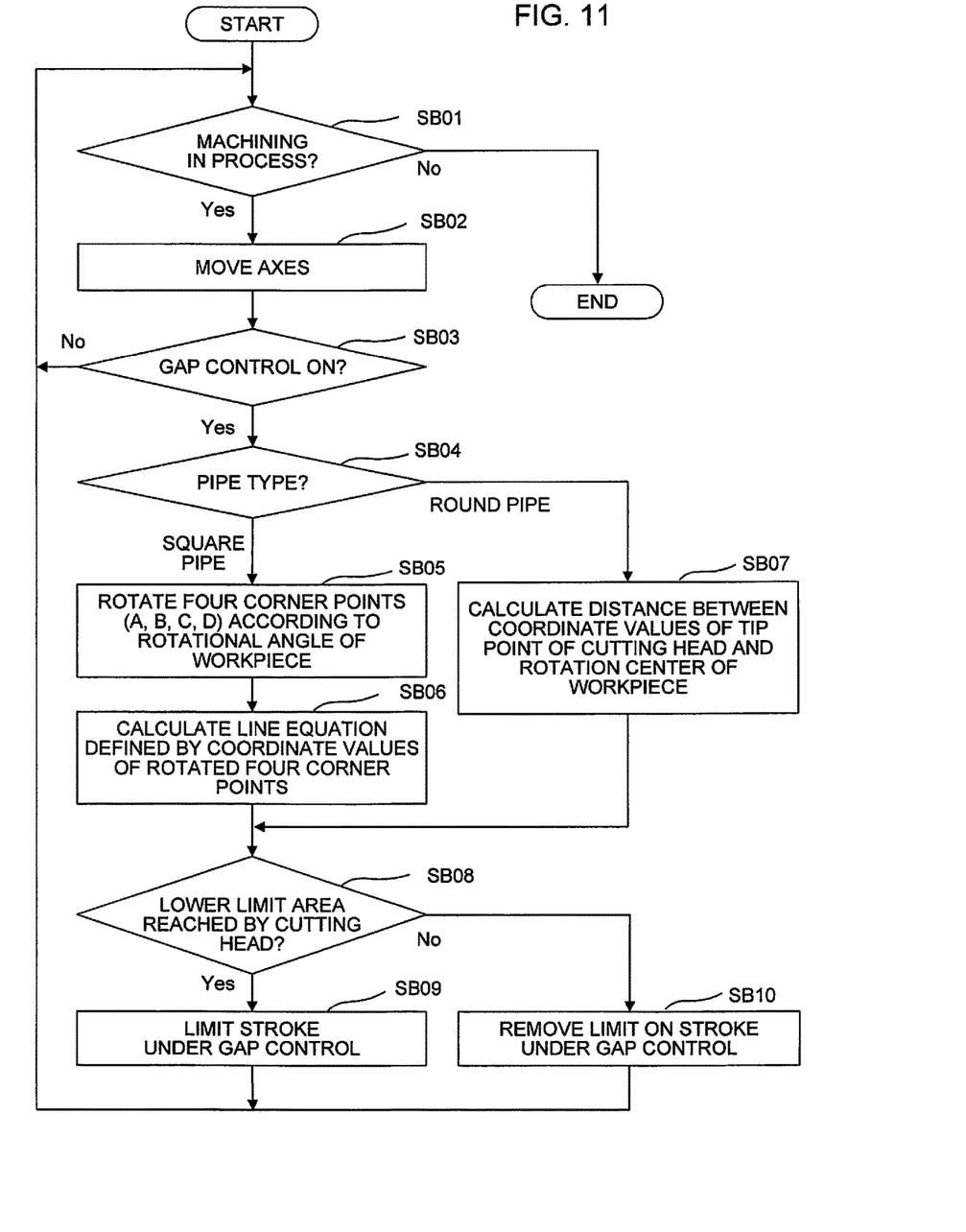
FIG. 11 is a flowchart showing an operation in which the machine is controlled by the controller of FIG. 9 to machine a pipe-shaped workpiece.

FIG. 11 is a flowchart showing an operation in which the machine (cutting head 3) is controlled by the controller 1 of FIG. 9 to machine a pipe-shaped workpiece.

[Step SB01] The control unit 10 determines whether or not the machining is being performed. If the machining is being performed, the processing proceeds to Step SB02. If not, this processing ends.

[Step SB02] The control unit 10 analyzes the machining command 20 and generates and outputs the move command data for each axis.

[Step SB03] The gap control unit 11 determines whether or not the gap control is on. If the gap control is on, the Z-axis stroke based on the gap control is compensated, whereupon the processing proceeds to Step SB04. If the gap control is off, the move command data is output directly to the motor control unit 12, whereupon the processing proceeds to Step SB01.

[Step SB04] The lower limit position limiting unit 14 determines whether or not the workpiece is a square pipe or a round pipe, based on the setting of the controller 1 or the like.

[Step SB05] The lower limit position limiting unit 14 calculates the coordinate values obtained by rotating the respective coordinate values of the four corner points (A, B, C and D) of the workpiece 6 at the rotation angle of the workpiece 6, based on each piece of information detected by the workpiece state detection unit 13.

[Step SB06] The lower limit position limiting unit 14 calculates a line equation for obtaining the lower limit of the movable area of the cutting head, based on the coordinate values after the rotation of the four corner portions calculated in Step SB05.

[Step SB07] The lower limit position limiting unit 14 calculates the distance between the rotation center of the workpiece 7 and the coordinate values of the tip point of the cutting head 3, whereupon the processing proceeds to Step SB08.

[Step SB08] The lower limit position limiting unit 14 determines whether or not the lower limit L of the movable area of the cutting head 3 is reached by the tip point of the cutting head 3, based on the result of the calculation in Step SB06 or SB07. If the lower limit L is reached, the processing proceeds to Step SB09. If not, the processing proceeds to Step SB10.

[Step SB09] The lower limit position limiting unit 14 limits the Z-axis stroke compensated by the gap control unit 11 so that the head tip point of the cutting head 3 does not reach the lower limit L of the movable area of the cutting head, whereupon the processing returns to Step SB01.

[Step SB10] The lower limit position limiting unit 14 removes the limit on the Z-axis stroke compensated by the gap control unit 11, whereupon the processing returns to Step SB01.

While an embodiment of the present invention has been described herein, the invention is not limited to the above-described embodiment and may be suitably modified and embodied in various forms.

The invention claimed is:

1. A controller for controlling a machine which performs cutting of a workpiece, the controller being configured to perform gap control such that a Z-axis position of a tip of a cutting head of the machine is not below a preset lower limit position while keeping the distance between the tip of the cutting head and the workpiece constant and comprising:
   a workpiece state detection unit configured to detect a state of the workpiece; and
   a lower limit position limiting unit configured to compensate the Z-axis position of the tip of the cutting head so as not to be below a substantial lower limit position calculated based on the state of the workpiece and the preset lower limit position if the Z-axis position of the tip of the cutting head is below the substantial lower limit position, wherein
   the state of the workpiece is information on an inclination of the workpiece, and the lower limit position limiting unit is configured to calculate the substantial lower limit position by transforming the preset lower limit position based on the information on the inclination of the workpiece.

2. A controller for controlling a machine which performs cutting of a workpiece, the controller being configured to perform gap control such that a Z-axis position of a tip of a cutting head of the machine is not below a preset lower limit position while keeping the distance between the tip of the cutting head and the workpiece constant and comprising:
   a workpiece state detection unit configured to detect a state of the workpiece; and
   a lower limit position limiting unit configured to compensate the Z-axis position of the tip of the cutting head so that the coordinate values of a substantial position of the tip of the cutting head relative to the workpiece transformed based on the state of the workpiece are not below the preset lower limit position if the coordinate values of the substantial position of the tip of the cutting head are below the preset lower limit position, wherein
   the state of the workpiece is information on an inclination of the workpiece, and the lower limit position limiting unit is configured to calculate the substantial the coordinate values of the position of the tip of the cutting head by transforming the coordinate values of the position of the tip of the cutting head based on the information on the inclination of the workpiece.

* * * * *